US007756595B2

(12) United States Patent
Asada et al.

(10) Patent No.: US 7,756,595 B2
(45) Date of Patent: Jul. 13, 2010

(54) METHOD AND APPARATUS FOR PRODUCING AND DISTRIBUTING LIVE PERFORMANCE

(75) Inventors: Kohei Asada, Kanagawa (JP); Kazushi Yoshida, Tokyo (JP)

(73) Assignee: Sony Corporation (JP)

( * ) Notice: Subject to any disclaimer, the term of this patent is extended or adjusted under 35 U.S.C. 154(b) by 803 days.

(21) Appl. No.: 11/446,748

(22) Filed: Jun. 5, 2006

(65) Prior Publication Data

US 2006/0224262 A1 Oct. 5, 2006

Related U.S. Application Data

(62) Division of application No. 10/043,067, filed on Jan. 9, 2002, now Pat. No. 7,096,080.

(30) Foreign Application Priority Data

Jan. 11, 2001 (JP) .......................... P2001-003716

(51) Int. Cl.
*G06F 17/00* (2006.01)

(52) U.S. Cl. ....................................................... 700/94

(58) Field of Classification Search ................... 700/94; 381/119, 63, 56; 369/1-12
See application file for complete search history.

(56) References Cited

U.S. PATENT DOCUMENTS

| | | | |
|---|---|---|---|
| 6,501,739 | B1 | 12/2002 | Cohen |
| 6,801,630 | B1 | 10/2004 | Shibata |
| 6,850,496 | B1 | 2/2005 | Knappe et al. |
| 2002/0103919 | A1 | 8/2002 | Hannaway |

FOREIGN PATENT DOCUMENTS

| | | | |
|---|---|---|---|
| JP | 59-030594 | A | 2/1984 |
| JP | 1-163798 | A | 6/1989 |
| JP | 2-204794 | A | 8/1990 |
| JP | 5-347629 | A | 12/1993 |
| JP | 5-347630 | A | 12/1993 |
| JP | 9-212163 | A | 8/1997 |
| JP | 9-297579 | A | 11/1997 |
| JP | 10-032603 | A | 2/1998 |
| JP | 10-190736 | A | 7/1998 |
| JP | 11-190993 | A | 7/1999 |
| JP | 11-219174 | A | 8/1999 |
| JP | 2000-035792 | A | 2/2000 |
| JP | 2000-122646 | A | 4/2000 |
| JP | 2000-163054 | A | 6/2000 |

OTHER PUBLICATIONS

English Translation of Japanese Office Action issued on Aug. 18, 2009, issued in Japanese Patent Application No. 2001-003716.

*Primary Examiner*—Andrew C Flanders
(74) *Attorney, Agent, or Firm*—Lerner, David, Littenberg, Krumholz & Mentlik, LLP

(57) ABSTRACT

When each live performance signal is transferred from one live performance providing apparatus to the next, with the live performance providing apparatuses having the respective connection orders thereof, the live performance signal is mixed with a live performance signal captured by the one apparatus. The end (n-th) live performance providing apparatus mixes a live performance signal captured by itself with the live performance signals mixed by all prior live performance apparatuses, thereby finally providing a complete live performance signal as a concert sound.

4 Claims, 9 Drawing Sheets

METHOD AND APPARATUS FOR PRODUCING AND DISTRIBUTING LIVE PERFORMANCE

CROSS-REFERENCE TO RELATED APPLICATIONS

This application is a Divisional of U.S. patent application Ser. No. 10/043,067 filed Jan. 9, 2002, the disclosure of which is hereby incorporated herein by reference, which claims priority of Japanese Patent Application No. 2001-003716, filed on Jan. 11, 2001, the entirety of which is incorporated by reference herein.

BACKGROUND OF THE INVENTION

1. Field of the Invention

The present invention relates to a method and apparatus for producing and distributing live performance, and a live performance system including a live performance providing apparatus and a live performance management device, in which contents of performance (for example, audio signals resulting from performance) performed by a plurality of players at remote places are transmitted through a network communication and synthesized (mixed) to complete live performance.

2. Description of the Related Art

As communication networks, such as the Internet or a satellite communication, have advanced, a variety of modes of use of the networks have been developed. In the field of music playing, for example, a plurality of players (hereinafter, also referred to as performers) at remote places may play at the same time, and captured sounds may be mixed through the network on a real-time basis to produce a concert (ensemble) sound.

If a plurality of performers attempt to play music in synchronization through the network on a real-time basis, a limitation on transfer capacity of the network and a time delay in signal transfer presents difficulty in achieving synchronization among them. Live performance by performers at remote places through the network is thus difficult.

SUMMARY OF THE INVENTION

Accordingly, the object of the present invention is to resolve the problem of transfer capacity by reducing the amount of information and by achieving an appropriate synchronization process to a delay time in signal transfer, and thereby to allow a plurality of performers to play live performance in a network-based live performance system through a network.

A live performance system of the present invention includes n live performance providing apparatuses for producing and distributing live performance (n is an integer not smaller than one) with the live performance providing apparatuses connected to each other through a communication network. The live performance providing apparatus includes an output unit for outputting a live performance guide output, based on at least one of synchronization information and a live performance signal supplied from another apparatus connected to the communication network, a capturing unit for capturing, as a live performance signal, a content performed in accordance with the live performance guide output from the output unit, and a transmitter for transmitting to another apparatus connected to the communication network, together with the supplied synchronization information, the live performance signal captured by the capturing unit or the live performance signal that is obtained by synthesizing the live performance signal captured by the capturing unit and the live performance signal supplied by another apparatus. The n live performance providing apparatuses are assigned first through n-th connection orders. The live performance providing apparatus having the first connection order transmits, together with the synchronization information, the live performance signal captured by the capturing unit to the live performance providing apparatus having the second connection order through the transmitter. One or a plurality of the live performance providing apparatuses having the second through the n-th connection orders outputs the live performance guide output through the output unit based on at least one of the synchronization information and the live performance signal transmitted from the live performance providing apparatus having an immediately prior connection order. When there exists one or a plurality of the live performance providing apparatuses having intermediate connection orders, other than the first order and the end, namely, the n-th connection order, the one or the plurality of live performance providing apparatuses having the intermediate connection orders transmits, through the transmitter to the live performance providing apparatus having a subsequent connection order, together with the supplied synchronization information, the live performance signal that is obtained by synthesizing the live performance signal captured by the capturing unit and the live performance signal supplied by the live performance providing apparatus having an immediately prior connection order.

Preferably, in the above live performance system, the live performance providing apparatus having the n-th connection order synthesizes the live performance signal captured by the capturing unit and the live performance signal supplied by the live performance providing apparatus having the immediately prior connection order, thereby obtaining a complete live performance signal, and the live performance providing apparatus having the n-th connection order transmits at least the complete live performance signal to a predetermined apparatus through the transmitter.

Preferably, the live performance system includes a live performance management device communicably connected to each of the live performance providing apparatuses through the communication network, wherein the live performance management device includes a synchronization correction unit which performs a synchronization correction process to each live performance signal based on the synchronization information when a plurality of live performance signals, each associated with synchronization information, is supplied by the live performance providing apparatuses, and a synthesizer for synthesizing the live performance signals that have been synchronization corrected through the synchronization correction unit to obtain a complete live performance signal. Each of the live performance providing apparatuses respectively assigned the first through the n-th communication orders transmits, together with the synchronization information, the live performance signal captured by the capturing unit to the live performance management device through the transmitter. After performing through the synchronization correction unit the synchronization correction process on the live performance signal from each of the live performance providing apparatus, the live performance management device synthesizes the live performance signals through the synthesizer, thereby obtaining a complete live performance signal as a result of mixing the live performance signal acquired by all live performance providing apparatuses.

The live performance system further includes a live performance management device, communicably connected to each of the live performance providing apparatuses through the communication network. The live performance providing apparatus includes a synthesis coefficient unit for setting a synthesis coefficient for the live performance signal captured by the capturing unit in the synthesis process by the synthesizer. The live performance management device includes a coefficient setting unit for transmitting a setting control signal, for setting the synthesis coefficient of the synthesis coefficient unit, to each of the live performance providing apparatuses.

The live performance management device includes a synchronization correction unit for performing a synchronization correction process on the live performance signal from the live performance providing apparatus in accordance with the synchronization information, a synthesizer for synthesizing a plurality of live performance signals that have been synchronization corrected through the synchronization correction unit, and a replay unit for replaying a live performance signal synthesized by the synthesizer.

Preferably, the live performance system includes a live performance management device, communicably connected to each of the live performance providing apparatuses through the communication network, and including a synchronization information transmitter which transmits the synchronization information to the live performance providing apparatus having the first connection order.

Preferably, at least the live performance providing apparatus having the first connection order includes a synchronization information generator for generating the synchronization information.

The present invention in another aspect relates to a live performance system including n live performance providing apparatuses for producing and distributing live performance (n is an integer not smaller than one) and a live performance management device with each of the live performance providing apparatuses connected to a live performance management device through a communication network. The live performance providing apparatus includes an output unit for providing a live performance guide output, based on synchronization information supplied from another apparatus connected to the communication network, a capturing unit for capturing, as a live performance signal, a content performed in accordance with the live performance guide output from the output unit, a first transmitter for transmitting, together with the supplied synchronization information, the live performance signal captured by the capturing unit to another apparatus connected to the communication network, and a second transmitter for transmitting the supplied synchronization information to another apparatus connected to the communication network. The live performance management device includes a synchronization correction unit for performing a synchronization correction process on the live performance signal based on the synchronization information when a plurality of live performance signals, each associated with the synchronization information, is supplied by the live performance providing apparatuses, and a synthesizer for synthesizing the live performance signals that have been synchronization corrected through the synchronization correction unit to obtain a complete live performance signal. The live performance providing apparatuses are assigned first through n-th connection orders, each of the live performance providing apparatuses transmits the live performance signal together with the synchronization information to the live performance management device through the first transmitter, and each of the live performance providing apparatuses having the second through the n-th connection orders provides a live performance guide output, based on the synchronization information transmitted from the second transmitter of the live performance providing apparatus having an immediately prior connection order.

The present invention in another aspect relates to a live performance providing apparatus for producing and distributing live performance, and includes an output unit for providing a live performance guide output, based on supplied synchronization information, a capturing unit for capturing, as a live performance signal, a content performed in response to the live performance guide output from the output unit, and a transmitter for transmitting, together with supplied synchronization information, the live performance signal captured by the capturing unit to another apparatus connected to a communication network.

Preferably, the live performance providing apparatus further includes a receiver for receiving a signal supplied through the communication network, wherein the supplied synchronization information is extracted from the signal received by the receiver.

Preferably, the signal received by the receiver is a live performance signal, associated with the synchronization information, transmitted from another apparatus, and the output unit outputs the live performance guide output, based on at least one of the synchronization information and the live performance signal.

Preferably, the live performance providing apparatus further includes a synthesizer for synthesizing the live performance signal captured by the capturing unit and the live performance signal received by the receiver, wherein the transmitter transmits the output of the synthesizer, together with the supplied synchronization information to another apparatus connected to the communication network.

Preferably, information setting the process of the signal processor is contained in the signal received by the receiver.

Preferably, the live performance providing apparatus further includes a signal processor for subjecting the live performance signal captured by the capturing unit to a mixing/panning coefficient process and/or an acoustic effect process, wherein information setting the process of the signal processor is contained in the signal received by the receiver, and wherein the transmitter transmits together with the supplied synchronization information the live performance signal processed by the signal processor to another apparatus connected to the communication network.

Preferably, the live performance providing apparatus further includes a synthesizer for synthesizing the live performance signal processed by the signal processor and the live performance signal received by the receiver, wherein the transmitter transmits the output of the synthesizer, together with the supplied synchronization information, to another apparatus connected to the communication network.

Preferably, information setting the process of the signal processor is contained in the signal received by the receiver.

Preferably, the live performance providing apparatus further includes a synchronization information generator for supplying the synchronization information.

The present invention in yet another aspect relates to a live performance management device and includes a synchronization correction unit for performing a synchronization correction process on a live performance signal based on synchronization information when a plurality of live performance signals, each associated with the synchronization information, is supplied through a communication network, and a synthesizer for synthesizing the live performance signals that have been synchronization corrected through the synchronization correction unit.

Preferably, the live performance management device further includes a replay unit for replaying the live performance signal synthesized by the synthesizer.

Preferably, the live performance management device further includes a synthesis information setting unit for transmitting synthesis information, which sets a synthesis process of the synthesizer, to a live performance live performance providing apparatus connected to the communication network.

Preferably, the live performance management device further includes a synchronization information generator for generating the synchronization information, wherein the synchronization information generator transmits the synchronization information to one of a plurality of live performance live performance providing apparatuses interconnected through the communication network.

The present invention in still another aspect relates to a live performance method for producing and distributing live performance through a communication network using a plurality of live performance providing apparatus, having first through n-th connection or communication orders (n is an integer not smaller than one) and connected to each other through the communication network. The live performance method includes a transmitting step in which the live performance providing apparatus having the first connection order transmits, together with synchronization information, a captured live performance signal to the live performance providing apparatus having the second connection order, an output step in which when each of the live performance providing apparatuses having the second through the n-th connection orders outputs a live performance guide output, based on at least one of the synchronization information and the live performance signal transmitted from the live performance providing apparatus having an immediately prior connection order, a transmitting step in which, when there exist the live performance providing apparatuses having the second through the (n−1)-th connection orders, each of the second through (n−1)-th live performance providing apparatuses transmits, to the live performance providing apparatus having a subsequent connection order, together with the synchronization information supplied by the live performance providing apparatus having an immediately prior connection order, the live performance signal that is obtained by synthesizing the captured live performance signal and the live performance signal supplied by the live performance providing apparatus having the immediately prior connection order, and a transmitting step in which the live performance providing apparatus having the n-th connection order synthesizes a captured live performance signal and the live performance signal transmitted from the live performance providing apparatus having the immediately prior connection order to generate a complete live performance signal and transmits the complete live performance signal to a predetermined apparatus.

The present invention in still further aspect relates to a live performance method for producing and distributing live performance through a communication network, using a plurality of live performance providing apparatus, having first through n-th connection or communication orders (n is an integer not smaller than one) and a live performance management device connected to each of the live performance providing apparatuses through the communication network. The live performance method includes a transmitting step in which the live performance providing apparatus having the first connection order transmits, together with synchronization information, a captured live performance signal to the live performance providing apparatus having the second connection order, an output step in which when each of the live performance providing apparatuses having the second through the n-th connection orders outputs a live performance guide output, based on at least one of the synchronization information and the live performance signal transmitted from the live performance providing apparatus having an immediately prior connection order, a transmitting step in which, when there exist the live performance providing apparatuses having the second through the (n−1)-th connection orders, each of the second through (n−1)-th live performance providing apparatuses transmits, to the live performance providing apparatus having a subsequent connection order, together with the synchronization information supplied by the live performance providing apparatus having an immediately prior connection order, the live performance signal that is obtained by synthesizing a captured live performance signal and the live performance signal supplied by the live performance providing apparatus having the immediately prior connection order, a transmitting step in which each of the live performance providing apparatus having the first through n-th connection orders transmits the captured live performance signal together with the supplied synchronization information to the live performance management device, and a step of generating a complete live performance signal by processing a synchronization correction process on the live performance signal from each of the live performance providing apparatuses in accordance with the synchronization information, and then by performing a synthesis process on the synchronization corrected live performance signal.

Each of the live performance providing apparatuses, connected in a chain configuration over the network, sends the captured (or mixed) live performance signal, such as audio data, and the synchronization information to a subsequent apparatus. Each live performance providing apparatus replays the live performance signals mixed by all prior live performance apparatuses as a guide for performance.

The end (n-th) live performance providing apparatus mixes a live performance signal captured by itself with the live performance signals mixed by all prior live performance apparatuses, thereby finally providing a complete live performance signal as a concert sound.

A complete live performance signal may be obtained by synchronization correcting a live performance signal from each live performance providing apparatus through the live performance management device before a mixing operation.

Before each live performance signal is transferred from one to a subsequent apparatus, the live performance signal is mixed with a live performance signal captured by the one apparatus. This arrangement prevents the amount of signal from increasing as the signal is transferred to a subsequent apparatus. In other words, transfer capacity requirements on the network are not increased. The synchronization information is also transferred together with the live performance signal along the chain of the apparatuses. In each apparatus, a live performance signal extracted in accordance with the synchronization information is replayed. Since the extracted live performance signal is mixed with the captured live performance signal, mixing is free from the effect of time delay in the network path.

In accordance with the live performance system of the present invention composed of the plurality of live performance providing apparatuses having the chain communication orders, the mixed live performance signal of all prior live performance providing apparatuses is sent to the subsequent live performance providing apparatus. In this arrangement, the amount of signal does not increase as the signal proceeds to the later live performance providing apparatus. In other words, without increasing the required transfer capacity, a number of live performance providing apparatuses can transfer performance contents of a number of performers. The synchronization information is also transmitted together with the live performance signal to the subsequent live performance providing apparatuses in a chain fashion. Each apparatus performs a synchronization process on the live performance signal in response to the synchronization information. Even with the time delay in the network transfer, the live performance signals are mixed without time misalignment.

At the end (n-th) live performance providing apparatus, the live performance signals captured and then mixed by all prior live performance providing apparatuses are mixed with the live performance signal obtained at the end live performance providing apparatus, and as a result, a complete live performance signal is obtained. Alternatively, the live performance signal from each live performance providing apparatus is subjected to the synchronization correction in the live performance signal management device, and is then mixed to result in a complete live performance signal.

The live performance is thus easily carried out by a plurality of performers using the network with the transfer capacity problem and the time delay problem resolved. The complete live performance signal of live performance is thus easily obtained.

Unlike the arrangement in which all performers play using the guide sound such as the clicking sound, each performer can use, as a guide, the replayed sound of the live performance signal of the live performance providing apparatus prior to its own communication order. Each performer can thus play music listening to the tempo or rhythm of the performer of the prior live performance providing apparatus. The ease with which each performer plays is thus improved. Each performer can play under an environment closer to live performance. End users listening to the performance can enjoy the tempo and rhythm with more realistic sensations.

Since each live performance management device sets the mixing coefficient for each live performance signal captured by the capturing unit, the live performance signal appropriately mixed at each live performance providing apparatus is replayed as a guide sound. The live performance signal is further set to an optimum mixing state as a complete live performance signal.

In response to the synchronization information, the live performance management device performs the synchronization correction process to the live performance signal from each live performance providing apparatus, and subjects the resulting live performance signal to a mixing process. The mixed live performance signal is then replayed to check the mixing state. An optimum mixing coefficient is thus set to each live performance providing apparatus.

DESCRIPTION OF THE PREFERRED EMBODIMENTS

One embodiment of the present invention is discussed hereinafter in which musical sounds played by a plurality of players (performers) at remote places are successively mixed to provide live performance in concert.

1. System Construction

Figure 1:
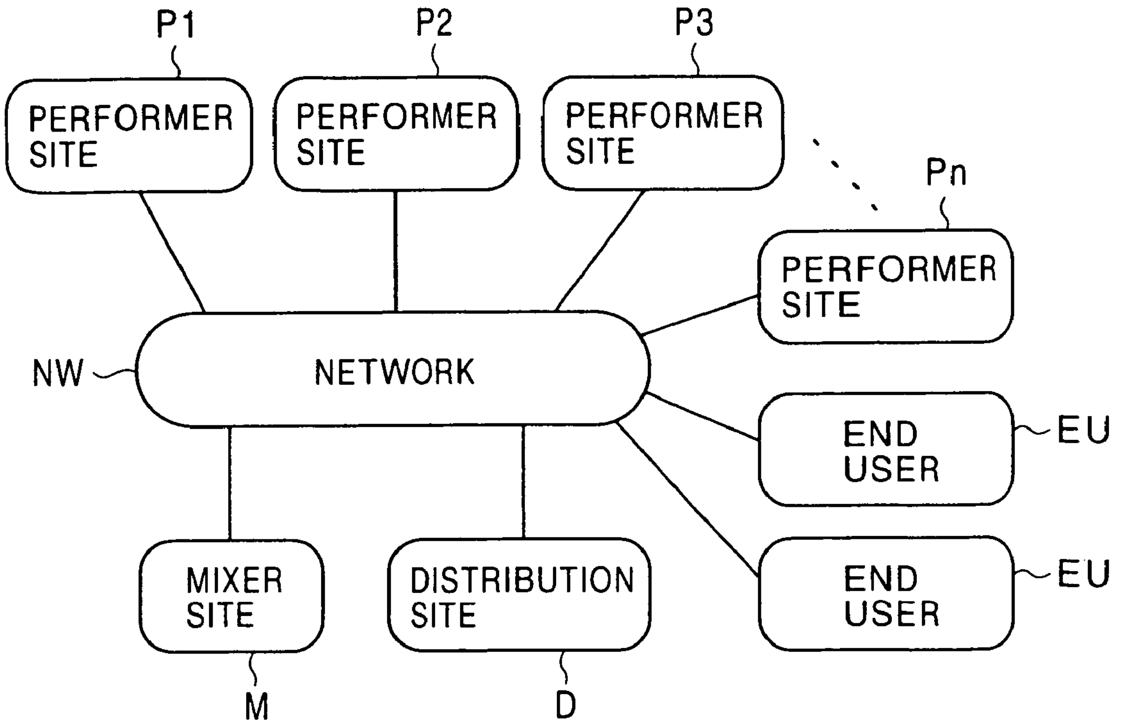
FIG. 1 is a block diagram of a live performance system in accordance with one embodiment of the present invention.

The system construction of a live performance system of one embodiment of the present invention is shown in FIG. 1.

The live performance system, connected to a network NW, includes various sites, each composed of interactive apparatuses. For example, each site includes a general-purpose computer having a network communication capability, and a dedicated apparatus with a function required to perform an operation discussed later.

The live performance system requires at least a plurality of performer sites P (P1-Pn) and a mixer site M.

A distribution site D distributes a content, such as a music content by live performance, to an unspecified number of end users EU or a particular end user EU.

The network NW is a communication network, such as the Internet, employing a public telephone line. Any of a variety of networks, such as a dedicated line, a satellite communication network, or an optical fiber network, may be used for the network NW.

The performer sites P (P1-Pn) have a capability of capturing a content played by respective performers, and correspond to live performance providing apparatuses. A terminal, namely, the apparatus serving as the performer site P, is embodied using hardware or software having a structure shown in FIG. 2.

For example, a single performer (or a plurality of performers) plays a musical instrument or sings a song at each performer site. The performer sites P1-Pn capture contents performed by the respective performers in the forms of respective live performance signals such as audio data, and mix the live performance signals, thereby generating music played by a band.

The performer sites P1-Pn are assigned communication orders so that the sites communicate with one another in a chain configuration during actual live performance. For example, performer sites P1-Pn are respectively assigned first through n-th communication orders.

The communication orders are flexibly set during live performance, rather than being uniquely set to the respective performer sites. For example, the performer site P1, which is the first to communicate, may serve as an end performer site the next time. In the discussion that follows, the performer sites P1-Pn are respectively assigned the first through n-th communication orders.

The number of performer sites P1-Pn in the live performance system is at least two (n(2).

The mixer site M controls the performer sites P1-Pn so that the live performance signals captured by the respective sites are properly mixed, and corresponds to the live performance management device in the context of the present invention.

Figure 3:
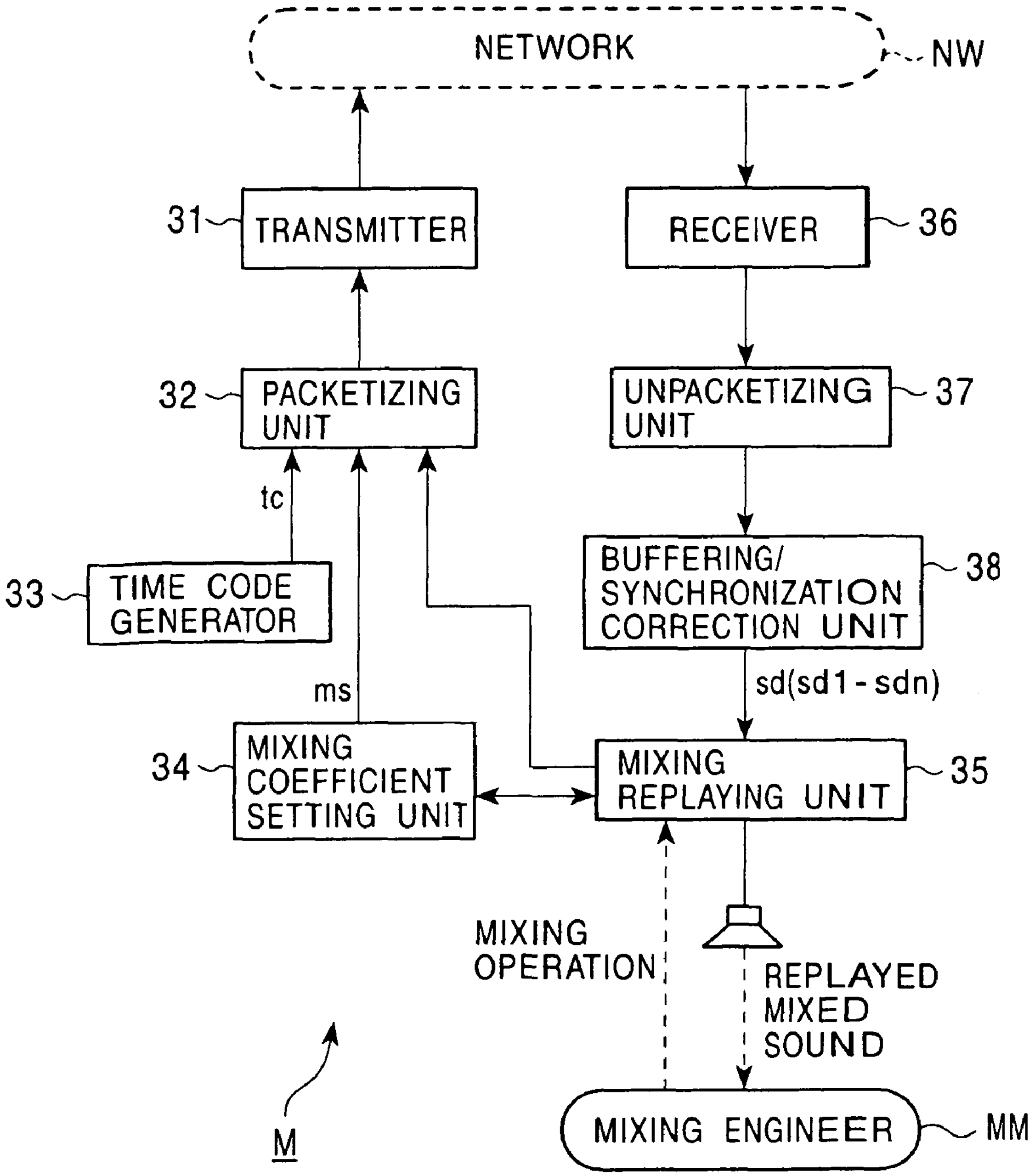
FIG. 3 is a block diagram of a mixer site of the embodiment of the present invention.

The construction of the mixer site M, shown in FIG. 3, is embodied in software or hardware.

The distribution site D receives music played and mixed by the performer sites P1-Pn, as complete live performance played by a band, and delivers the data of such music to the end users EU. In other words, the distribution site D has the function of a server.

The distribution site D distributes the music, produced by the performer sites P1-Pn and the mixer site M, to the end users EU on a real-time basis. Alternatively, the distribution site D stores the produced music in a data base to distribute it later. Alternatively, the distribution site D stores the music in a storage medium, such as an optical disk or a semiconductor memory, and then sells or supplies the end users EU with the storage medium with the music stored therewithin.

Construction of the Performer Site

Figure 2:
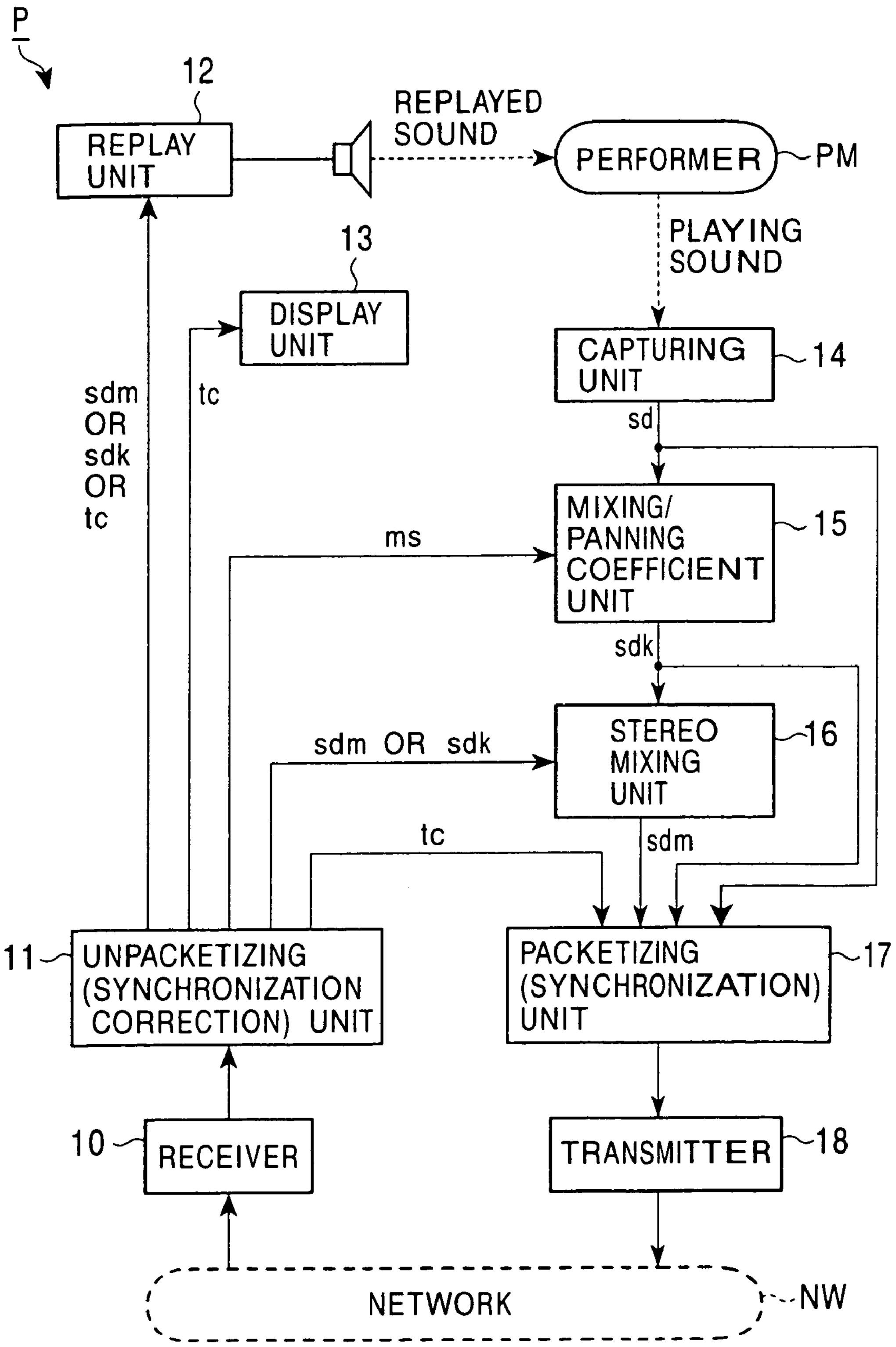
FIG. 2 is a block diagram of a performer site of the embodiment of the present invention.

The performer sites P (P1-Pn) as terminal apparatuses are embodied in hardware or software as shown in FIG. 2.

In the apparatus shown in FIG. 2, there are shown a variety of lines of signals transferred between blocks. The signal lines diagrammatically represent signals transferred within the apparatus, and do not necessarily reflect actual transfer path structures between the actual blocks. For example, the blocks may be interconnected within the apparatus using a bus. If the blocks are embodied in software, required signals may be read from a memory within the apparatus as necessary. The same is true of the construction of a mixer site shown in FIG. 3.

FIG. 2 and FIG. 3, as will be discussed later, show functional blocks. Each block may be embodied in hardware. Alternatively, the blocks may be in part or in whole embodied in software. In such a case, the actual hardware structure may include a CPU, a ROM, a RAM, and an interface.

A receiver 10 receives a variety of pieces of information transmitted from the performer site P through the network NW. Information may be exchanged through the network NW in a predetermined packet data communication method, such as TCP (Transmission Control Protocol) or UDP (User Datagram Protocol).

An unpacketizing unit 11 unpacketizes data packet received by the receiver 10, and extracts required information therefrom.

In this embodiment, a time code tc as synchronization information is exchanged over the network NW together with a live performance signal such as audio data captured by each performer site P as will be discussed later. The unpacketizing unit 11 performs a synchronization correction process so that the received audio data is output in synchronization with the time code tc.

A replay unit 12 replays a sound serving as a guide for playing to a performer PM.

There are times when the replay unit 12 receives the time code tc, or a live performance signal sdm or sdk as the audio data.

The live performance signal sdm is the audio data that is obtained by capturing and mixing live performance signals through a plurality of performer sites arranged prior to a given performer site P in communication order. The live performance signal sdk is the audio data that is obtained by capturing a live performance signal through a given performer site P and by imparting thereto a mixing coefficient through a mixing/panning coefficient unit 15 discussed later. Specifically, the live performance signal sdk is the audio data which is captured and then given the mixing coefficient in a single performer site P, and the live performance signal sdm is the audio data which is captured by more than one performer site P and then mixed.

The performer sites P1-Pn are assigned communication orders, and which one of the time code tc, the live performance signal sdm and the live performance signal sdk, is supplied to the replay unit 12 depends on the communication order of each performer site P.

As will be detailed later, the replay unit 12 in the first performer site P1 is supplied with the time code tc transmitted from the mixer site M. In response to the time code tc, the replay unit 12 outputs a clicking sound (a guide sound for rhythm/tempo) from a loudspeaker. In this case, instead of a simple clicking sound, a melody guide sound may be output in synchronization with the time code tc so that a rhythm pattern or the progress of a melody reflecting the mood of the music is felt.

Each of the performer sites P having the second and later communication orders receives the live performance signal sdm or the live performance signal sdk at the replay unit 12. The replay unit 12 digital-to-analog converts and amplifies the audio data as the live performance signal sdm or the live performance signal sdk (such as PCM linear audio data), and outputs the replayed audio data from the loudspeaker.

The clicking sound and the live sound from a prior performer site P, output from the replay unit 12, serve as a guide with which the performer PM at the performer site P plays.

At each performer site P, the performer PM plays an musical instrument or sings a song in concert with the clicking sound and the live sound from the prior performer site P.

A display 13 is used to display a visual guide for the performer PM.

Now, a musical score of a music is displayed on the display 13 for the performer PM for live performance. The received time code tc is fed to the display 13, and the display 13 displays the current playing position on the musical score in response to the time code tc. When the replay unit 12 replays the clicking sound in response to the time code tc, the current playing position on the musical score is synchronized with the replayed sound. When the live performance signal sdm or sdk is replayed on the replay unit 12, the time code tc and the live performance signal sdm or sdk are subjected to a synchronization process through the unpacketizing unit 11, and the current playing position on the musical score is synchronized with the replayed sound.

Based on the replayed sound and the displayed musical score, each performer PM can play in synchronization with other performers PM.

The displayed musical score data may be transmitted from the mixer site M (or may be transmitted in a package storage medium) and is then stored. Alternatively, each performer PM may independently prepare the musical score data.

A capturing unit 14 includes a microphone system, an MIDI sound system, a line input system, an analog-to-digital converter, etc., and captures the content played or sung by the performer PM as two-channel digital audio data.

The music content captured by the capturing unit 14 is output as a live performance signal sd in the form of stereo two-channel audio data. For convenience of explanation, the live performance signal sd is a signal that is just output by the capturing unit 14.

The mixing/panning coefficient unit 15 imparts mixing coefficients to the live performance signal sd as the two-channel audio data, the mixing coefficient being used to mix the live performance signal sd with another live performance signal at a subsequent stereo mixing unit 16. The mixing coefficients set an audio level and a panning position between a stereo L and a stereo R.

A coefficient calculation is performed on the live performance signal sd to reach a required audio level so that a mixing balance for mixing the live performance signal sd with other live performance signals sdm and sdk is properly set. A panning coefficient calculation is performed so that a panning position in the two-channel stereo of the live performance signal sd is properly set.

The coefficients at the mixing/panning coefficient unit 15 are set by a coefficient control signal ms transmitted from the mixer site M. Optionally, the coefficients may be manually set by an operator at each performer site P.

The stereo mixing unit 16 mixes the stereo two-channel live performance signal sdk, to which the mixing coefficient is imparted by the mixing/panning coefficient unit 15, with the stereo two-channel live performance signal sdk or sdm transmitted from another performer site P, and then outputs the mixed stereo two-channel live performance signal sdm.

A packetizing unit 17 packetizes data to be transmitted to another site from this performer site P through the network NW.

The audio data to be transmitted includes the live performance signal sd or sdk or sdm, and the time code tc. When packetizing the data, the packetizing unit 17 synchronizes the live performance signal sd or sdk or sdm in the form of two-channel stream data, with the time code tc.

A variety of examples is contemplated as a packet data format. It is important that the timing of a data stream of the live performance signal sd or sdk or sdm correspond to each time code value of the time code tc.

A transmitter 18 transmits the data packetized by the packetizing unit 17 through the network NW.

In other words, the transmitter 18 transmits the two-channel audio data stream and the time code tc to another performer site P, and various pieces of control information required for communication between the mixer site M and another performer site P to these sites.

3. Construction of the Mixer Site

FIG. 3 shows the construction of the mixer site M in a block diagram in a manner similar to FIG. 2.

The mixer site M here has the function of providing the timing used as a reference by the performer PM at each performer site P, the function of setting and controlling the mixing coefficients, and the function of mixing and replaying the live performance signal sd captured by each performer site P.

A packetizing unit 32 packetizes data to be transmitted to another site from the mixer site M via the network NW.

A transmitter 31 transmits the data packetized by the packetizing unit 32 to another site through the network NW.

A time code generator 33 is arranged to set the timing of playing at each performer site P.

The time code generator 33 generates the time code tc in the form of data stream during playing. The time code tc is packetized by the packetizing unit 32, and is sent to only the first performer site P1 through the transmitter 31.

A receiver 36 receives various pieces of information in a data packet transmitted the mixer site M through the network NW. An unpacketizing unit 37 unpacketizes the data packet received by the receiver 36, and extracts required information.

There are times when the time code tc as the synchronization information is transmitted together with the live performance signal sd such as the audio data captured by each performer site P to the mixer site M. Specifically, a plurality of performer sites P respectively transmits the live performance signal sd synchronized with the time code tc to the mixer site M.

In this case, each live performance signal sd from the respective performer site P is received by the mixer site M with a time delay occurring in network transfer. In other words, the performer at each performer site P supplies the mixer site M with the musical sound by each performer site with a respective time delay introduced therewithin. Since the live performance signal sd, when transmitted from each performer site P, is synchronized with the time code tc, the time difference between the live performance signals sd is corrected using the time code tc for the respective live performance signal sd.

Such a process is carried out by a buffering/synchronization correction unit 38. The buffering/synchronization correction unit 38 buffers each of the live performance signals sd1-sdn from the respective performer sites P1-Pn, and outputs the live performance signals sd1-sdn at the timings synchronized with the time codes tc1-tcn.

The live performance signals sd1-sdn from the respective performer sites P1-Pn are thus output in synchronization free from the time delay.

A mixing replay unit 35 receives and mixes the synchronization corrected, live performance signals sd1-sdn from the respective performer sites P1-Pn. A mixing operation is carried out by a mixing engineer MM. Each live performance signal sd is mixed in accordance with a mixing level and a panning setting which are set by the mixing engineer MM for each live performance signal sd. The audio data as a concert sound from the performer sites P thus results.

The mixing replay unit 35 performs a replay process on the mixed audio data, and outputs the audio sound from a loudspeaker, etc. Listening to the replayed sound, the mixing engineer MM adjusts the mixing level and the panning setting to the proper settings thereof.

A mixing coefficient setting unit 34 generates a coefficient control signal ms which gives a mixing coefficient to each of the performer sites P1-Pn.

The mixing coefficients respectively provided to the performer sites P1-Pn are those at an optimum mixing state set by the mixing engineer MM at the mixing replay unit 35. The coefficient values of the mixing/panning coefficient unit 15 are determined so that the mixing level and the panning setting for each of the live performance signals sd1-sdn at the optimum mixing state result in the live performance signal sdk. To this end, the coefficient control signals ms are respectively generated for the performer sites P1-Pn.

4. System Operation 4-1. Operation During a Rehearsal

The operation of the live performance system including the performer sites P1-Pn and the mixer site M will be discussed hereinafter.

In preparation for live performance, a communication for a rehearsal phase and a communication for a mixing coefficient setting phase are performed.

The rehearsal phase operation is discussed below. Two communication examples in the rehearsal phase operation is now discussed, referring to FIGS. 4 and 5.

FIGS. 4 through 8 illustrate signal routings through which communications are made between sites. From among functional blocks of the performer site P and the mixer site M, the receivers 10 and 36, the transmitters 18 and 31, the packetizing units 17 and 32, the unpacketizing units 11 and 37, and the buffering/synchronization correction unit 38 are not shown. The signal routings related to the synchronization and the synchronization correction are respectively referred to as a synchronization process 20, or a synchronization correction process 21 or 40.

For simplicity of explanation, the number of performer sites P are three, i.e., a first performer site P1, a middle performer site P2, and an end performer site P3. The performer PM at the first performer site P1 is a drummer, the performer PM2 at the middle performer site P2 is a bass guitarist, and the performer PM3 at the end performer site P3 is a vocalist (a singer). Live performance is thus performed by drums, a bass guitar and a vocal.

In an actual system, the number of performer sites P is at least two, and may be determined depending on the number of performers PM (the number of performer sites P is not fixed in the system). When two performer sites P play, the middle performer site is dispensed with. When four or more performer sites P play, the number of middle performer sites P becomes plural.

Communication Operation Example 1 During Rehearsal

Figure 4:
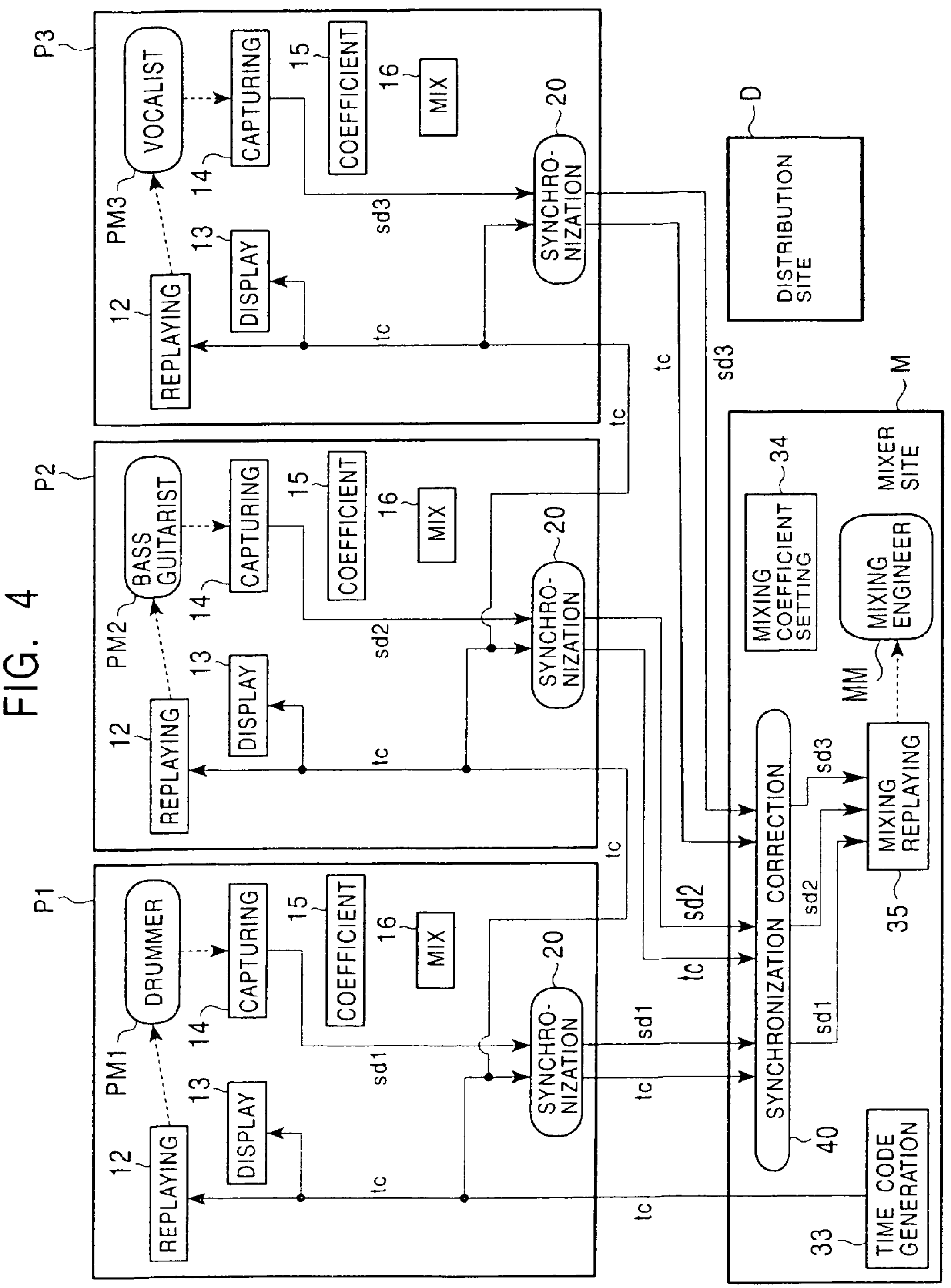
FIG. 4 is a diagram illustrating the system in one transfer state thereof during a rehearsal phase.

FIG. 4 shows a communication operation example 1 during a rehearsal phase.

During the rehearsal phase, the time code generator 33 in the mixer site M generates and transmits the time code tc to the first performer site P1.

In response to the time code tc, the replay unit 12 in the first performer site P1 replays a performance guide sound such as a clicking sound, and displays the point of progress of music on a musical score image presented on the display 13.

The performer PM1 at the first performer site P1 drums in concert with the clicking sound and the musical score.

The first performer site P1 captures a drum sound by the performer PM1 as the two-channel audio data through the capturing unit 14, and outputs the audio data as the live performance signal sd1.

The live performance signal sd1 is synchronized with the currently received time code tc in the synchronization process 20, and the live performance signal sd1 and the time code tc are together sent to the mixer site M.

The first performer site P1 transmits the time code tc to the middle performer site P2.

In response to the received time code tc, the middle performer site P2 replays and outputs the performance guide sound such as a clicking sound, and displays the point of progress of the music on the musical score image on the display 13.

The performer PM2 at the middle performer site P2 plays the bass guitar in concert with the clicking sound and the musical score.

Due to a signal delay in the network transfer, the time code tc received by the middle performer site P2 suffers a time delay with respect to the time code tc received by the first performer site P1. The drumming by the performer PM1 and the bass guitar playing by the performer PM2 are carried out at different timings corresponding to the time delay.

The bass guitar sound by the performer PM2 is captured by the capturing unit 14 as the two-channel audio data at the middle performer site P2, and is output as the live performance signal sd2.

The live performance signal sd2 is synchronized with the currently received time code tc in the synchronization process 20, and the live performance signal sd2 and the time code tc are together sent to the mixer site M.

The middle performer site P2 transmits the time code tc to the end performer site P3.

In response to the received time code tc, the replay unit 12 in the end performer site P3 replays and outputs a live performance guide sound such as a clicking sound, and displays the point of progress of the music on the musical score image on the display 13.

The performer PM3 sings a song in concert with the clicking sound and the musical score at the end performer site P3.

Due to a signal delay in the network transfer, the time code tc received by the end performer site P3 suffers from the time delay with respect to each of the time code tc received by the first performer site P1 and the time code tc received by the middle performer site P2. The song is sung by the performer PM3 in a different timing corresponding to time delays from the drumming by the performer PM1 and the bass guitar playing by the performer PM2.

The vocal sound by the performer PM3 is captured by the capturing unit 14 as two-channel audio data at the end performer site P3, and is output as a live performance signal sd3.

The live performance signal sd3 is synthesized with the currently received time code tc in the synchronization process 20, and the live performance signal sd3 and the time code tc are sent together to the mixer site M.

In the operation by the performer sites P1-Pn, the mixer site M receives the live performance signal sd1 and the time code tc from the first performer site P1, the live performance signal sd2 and the time code tc from the middle performer site P2, and the live performance signal sd3 and the time code tc from the end performer site P3.

Due to a signal delay occurring in the network transfer, the live performance signals sd1, sd2, and sd3 suffer from slightly misaligned timings. In other words, the end performer site P3 suffers from the largest delay.

The synchronization correction process 40 is performed using as a reference the time codes tc which have been respectively transmitted together with the live performance signals sd1, sd2, and sd3. Specifically, each of the live performance signals sd1, sd2, and sd3 is buffered in the synchronization correction process 40 and is fed to the mixing replay unit 35 at the timing at which the time codes tc are timed.

In this way, the mixing replay unit 35 mixes the live performance signals sd1, sd2, and sd3 without no time delay in the network transfer. The mixing engineer MM operates the mixing replay unit 35 to an optimum mixing state while listening to the mixed replayed sound, i.e., the mixed sound of drumming, bass guitar playing, and vocal.

With the optimum mixing state achieved, the operation then enters the next mixing coefficient setting phase.

Communication Operation Example 2 During Rehearsal

Figure 5:
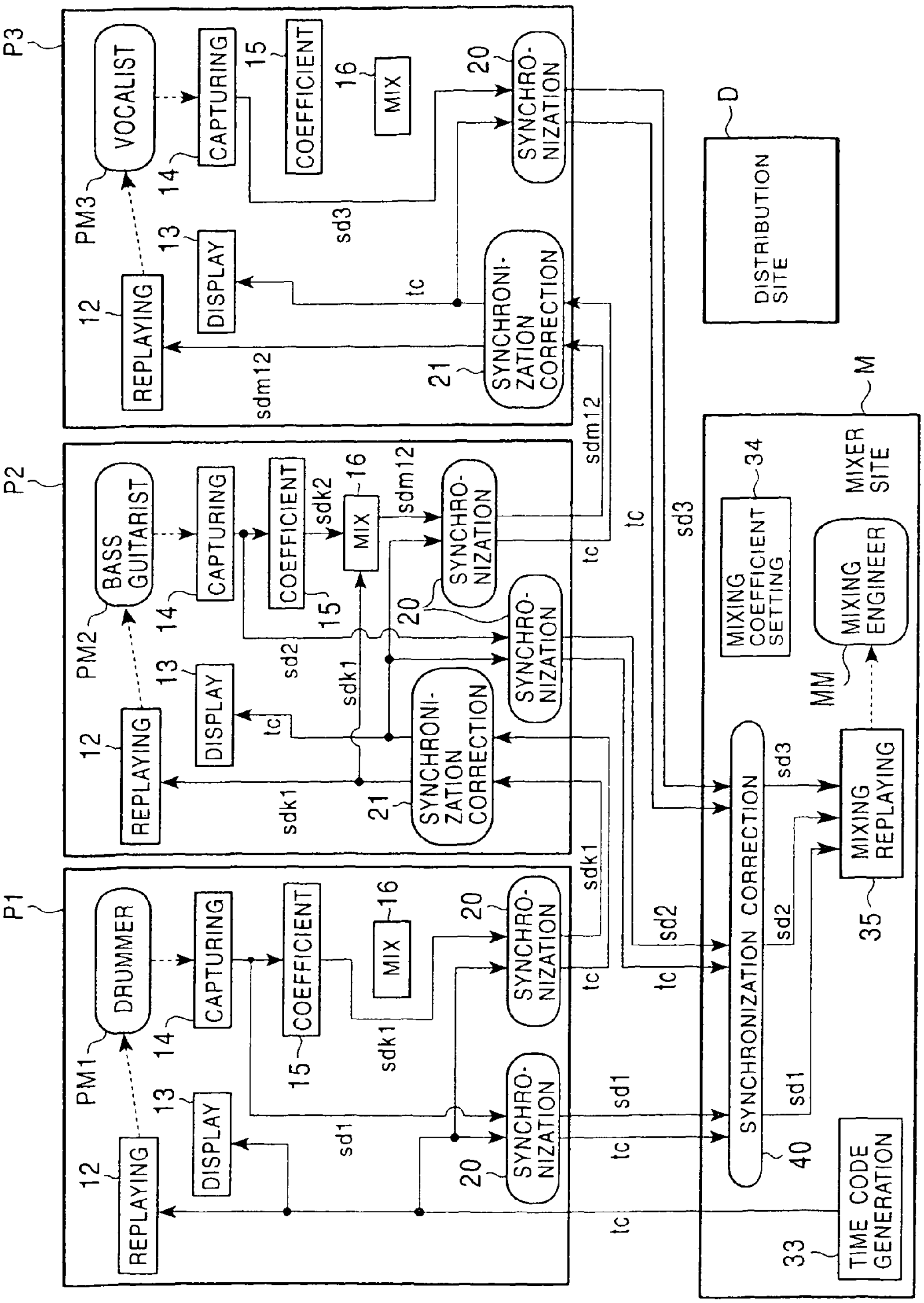
FIG. 5 is a diagram illustrating the system in another transfer state thereof during the rehearsal phase.

A communication operation during a rehearsal phase shown in FIG. 5 is also contemplated.

In the operation shown in FIG. 4, all performers PM1-PM3 perform based on the clicking sound responsive to the time code tc. In this arrangement, some performers have difficulty in playing music. For example, a drummer can drum in response to the clicking sound without much difficulty, but a player of a reed instrument or a vocalist may desire the musical sound by the other player.

During a rehearsal, the operation shown in FIG. 4 presents no difficulty. To play music during a rehearsal phase in a near live mode, the following arrangement is preferred. The performers PM, other than the performer PM1 at the first performer site P1, monitor the musical sound played by the performers having the prior communication orders.

During a rehearsal phase shown in FIG. 5, the time code generator 33 in the mixer site M generates the time code tc, and transmits the time code tc to the first performer site P1.

In response to the received time code tc, the first performer site P1 replays and outputs a live performance guide sound such as a clicking sound from the replay unit 12 and displays the point of progress of the music on the musical score image on the display 13.

The performer PM1 at the first performer site P1 drums in concert with the clicking sound and the musical score.

The first performer site P1 captures a drum sound by the performer PM1 as the two-channel audio data through the capturing unit 14, and outputs the audio data as the live performance signal sd1.

The live performance signal sd1 is synchronized with the currently received time code tc in the synchronization process 20, and the live performance signal sd1 and the time code tc are together sent to the mixer site M.

The captured live performance signal sd1 is subjected to a mixing coefficient process in the mixing/panning coefficient unit 15, becoming a live performance signal sdk1. The live performance signal sdk1 is synchronized with the currently received time code tc in the synchronization process 20 and is then transmitted to the middle performer site P2.

The mixing coefficient may be tentative. For example, the performer PM1 or the operator at the first performer site P1 may set the mixing coefficient to any value.

Alternatively, the mixer site M may transmit a coefficient control signal ms during the mixing coefficient setting discussed later, setting a tentative mixing coefficient (for a rehearsal).

Alternatively, the captured live performance signal sd1, rather than the coefficient processed live performance signal sdk1, is synchronized with the time code tc, and the live performance signal sd1 and the time code tc are then transmitted to the middle performer site P2. The coefficient process may be performed in the replay unit 12 in the middle performer site P2 as will be discussed later. In this case, the same signal as that transmitted to the mixer site M is transmitted to the middle performer site P2.

The middle performer site P2 performs a synchronization correction process 21 on the live performance signal sdk1 and the time code tc transmitted from the first performer site P1. Specifically, the middle performer site P2 extracts the live performance signal sdk synchronized with the time code tc as the form of real-time stream data. The live performance signal sdk1 is fed to the replay unit 12, which in turn replays the live performance signal sdk1 (namely, a drum sound).

The display 13 shows the point of progress of the music over the musical score in accordance with the received time code tc.

The performer PM2 at the middle performer site P2 plays the bass guitar in concert with the drum sound and the musical score image.

Due to a signal delay in the network transfer, the time code tc and the live performance signal sdk1 received by the middle performer site P2 suffers a time delay with respect to the time code tc received by the first performer site P1. The drum sound replayed by the middle performer site P2 is slightly delayed from the timing of the live drumming at the first performer site P1. The bass guitar is played by the performer PM2 in synchronization with the replayed drum sound (with a delay time).

The bass guitar sound by the performer PM2 is captured by the capturing unit 14 as the two-channel audio data at the middle performer site P2, and is output as the live performance signal sd2.

The live performance signal sd2 is synchronized with the currently received time code tc in the synchronization process 20, and the live performance signal sd2 and the time code tc are together sent to the mixer site M.

The captured live performance signal sd2 is processed with an arbitrary mixing coefficient in the mixing/panning coefficient unit 15, becoming a live performance signal sdk2. The live performance signal sdk2 is mixed with the received live performance signal sdk1 in the stereo mixing unit 16, and is output as a live performance signal sdm12 (i.e., the drum sound+the bass guitar sound). The live performance signal sdm12 is synchronized with the received time code tc and then the live performance signal sdm12 and the time code tc are transmitted to the end performer site P3.

If no difficulty is presented on playing, the captured live performance signal sd2 or the coefficient processed live performance signal sdk2 may be synchronized with the time code tc, and is then transmitted to the end performer site P3 from the middle performer site P2.

In the end performer site P3, the live performance signal sdm12 and the time code tc transmitted from the middle performer site P2 are subjected to the synchronization correction process 21. Specifically, the end performer site P3 extracts the live performance signal sdm12 synchronized with the time code tc in the form of real-time stream data. The live performance signal sdm12 is fed to the replay unit 12, which in turn replays the live performance signal sdm12 (namely, the mix of the drum sound and the bass guitar sound).

The display 13 shows the point of progress of the music over the musical score in accordance with the received time code tc.

The performer PM3 at the end performer site P3 sings a song in concert with the drum sound, the buss guitar sound, and the musical score.

Due to the delay time involved in the network transfer, the musical sound and time code tc replayed by at the end performer site P3 are delayed from the live performance timings at the first performer site P1 and the middle performer site P2. The vocalist sings in concert with the replayed drum sound and the bass guitar sound (with the time delay).

The end performer site P3 captures the vocal sound of the performer PM3 as two-channel audio data through the capturing unit 14, and outputs the two-channel audio data as a live performance signal sd3.

The live performance signal sd3 is synchronized with the time code tc in the synchronization process 20, and is then transmitted together with the time code tc to the mixer site M.

In response to the operations of the performer sites P1-Pn, the mixer site M receives the live performance signal sd1 and the time code tc from the first performer site P1, the live performance signal sd2 and the time code tc from the middle performer site P2, and the live performance signal sd3 and the time code tc from the end performer site P3.

The detail of the operation of the mixer site M has been described with reference to FIG. 4, and is thus skipped here. The live performance signals sd1, sd2, and sd3, received with respective time delays involved in the network transfer, are subjected to the synchronization correction process 40, and are then fed to the mixing replay unit 35.

The mixing replay unit 35 mixes the live performance signals sd1, sd2, and sd3 without time delay from the network transfer. The mixing engineer MM operates the mixing replay unit 35 to an optimum mixing state while listening to the mixed replayed sound. With the optimum mixing state achieved, the operation then enters the next mixing coefficient setting phase.

4-2. Operation During Mixing Coefficient Setting Phase

Figure 6:
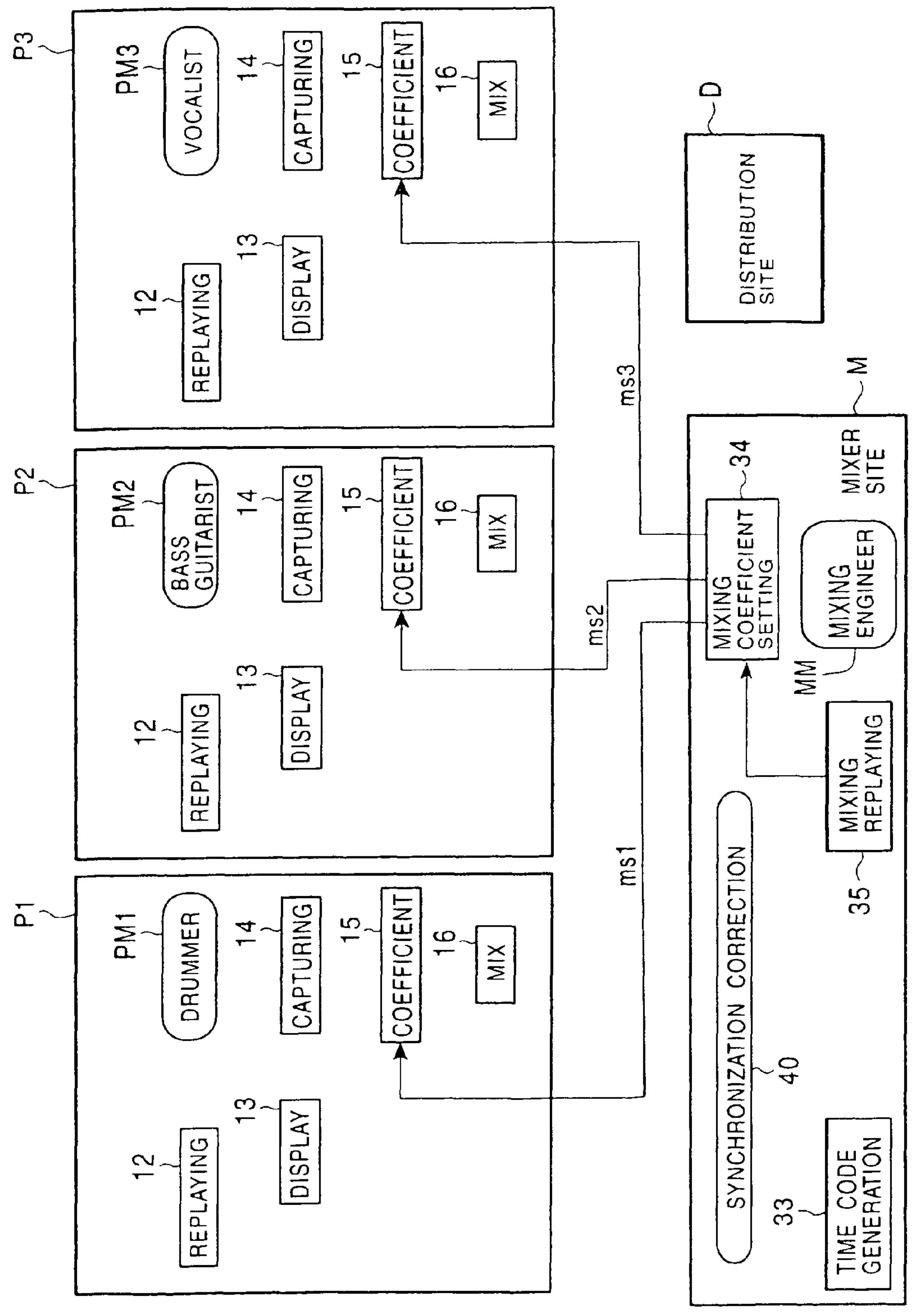
FIG. 6 is a diagram illustrating the system in another transfer state thereof during a mixing coefficient setting phase.

FIG. 6 shows a communication state during a mixing coefficient setting phase.

Subsequent to the communication shown in FIG. 4 or FIG. 5, the mixer site M sets the live performance signals sd1, sd2, and sd3 by the respective performers P to a mixing state considered as optimum by the mixing engineer MM. In other words, the mixing engineer MM adjusts the mixing level and the panning position of the live performance signals sd1, sd2, and sd3 to the best setting thereof. In succession, the same optimum mixing state is set in each of the performer sites P1-P3.

To this end, the mixer site M transfers, to the mixing coefficient setting unit 34, the mixing coefficients of the live performance signals sd1, sd2, and sd3 in the optimum mixing state in the mixing replay unit 35. The mixing coefficient setting unit 34 generates coefficient control signals ms1, ms2, and ms3 respectively for the performer sites P1-P3.

The coefficient control signal ms1 for the first performer site P1 is generated so that the mixing coefficient imparted to the live performance signal sd1 in the mixing replay unit 35 is also provided by the mixing/panning coefficient unit 15 at the first performer site P1.

The coefficient control signal ms2 for the middle performer site P2 is generated so that the mixing coefficient imparted to the live performance signal sd2 in the mixing replay unit 35 is also provided by the mixing/panning coefficient unit 15 at the middle performer site P2.

The coefficient control signal ms3 for the end performer site P3 is generated so that the mixing coefficient imparted to the live performance signal sd2 in the mixing replay unit 35 is also provided by the mixing/panning coefficient unit 15 at the end performer site P3.

The mixer site M sends the coefficient control signals ms1, ms2, and ms3 respectively to the performer sites P1, P2, and P3.

The mixing/panning coefficient units 15 at the performer sites P1, P2, and P3 respectively set multiplication coefficients thereof in response to the coefficient control signals ms1, ms2, and ms3.

The setting of the coefficients completes the preparation of the live performance.

4-3. Operation of the Live Performance

Figure 7:
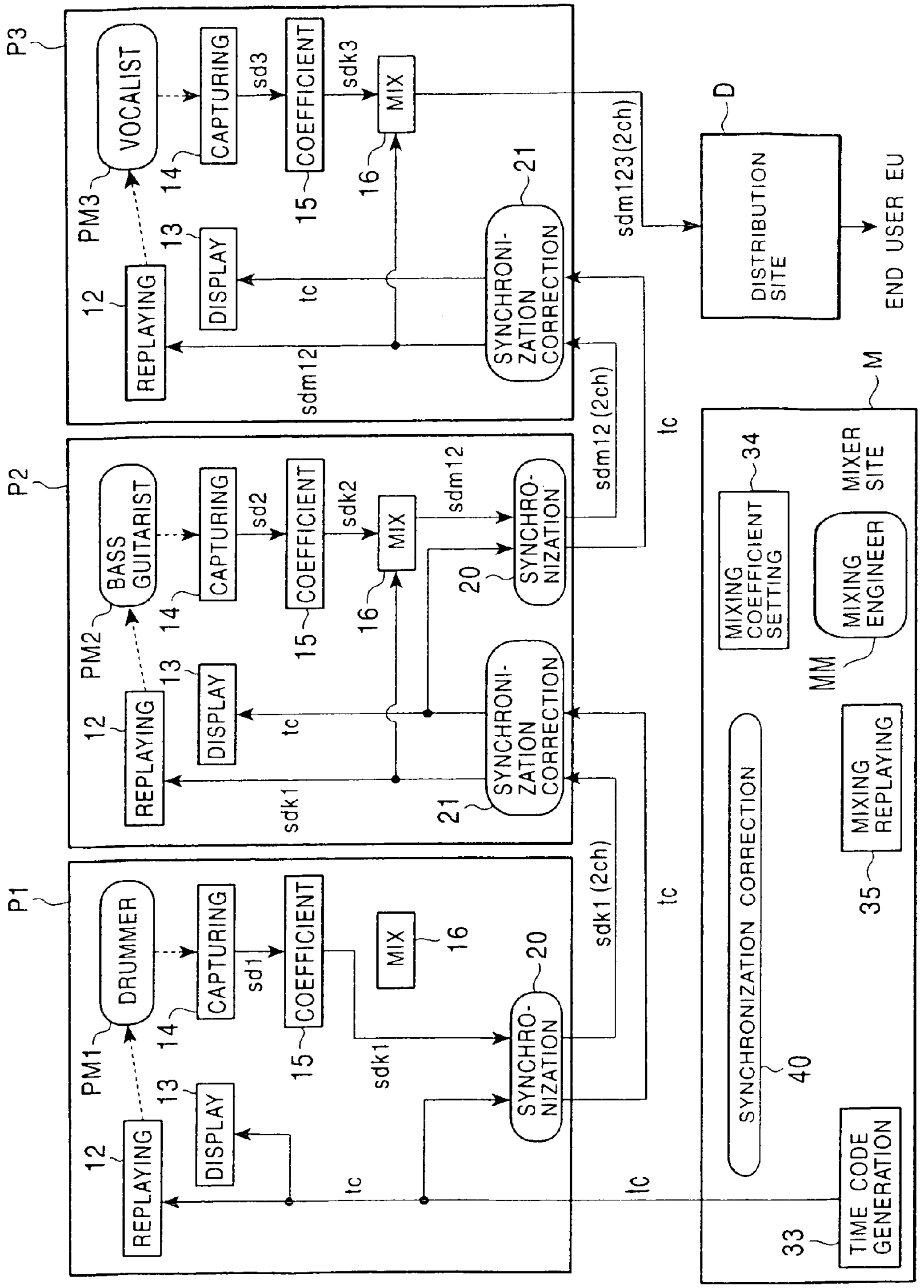
FIG. 7 is a diagram illustrating the system in one transfer state thereof during a live performance phase.
Figure 8:
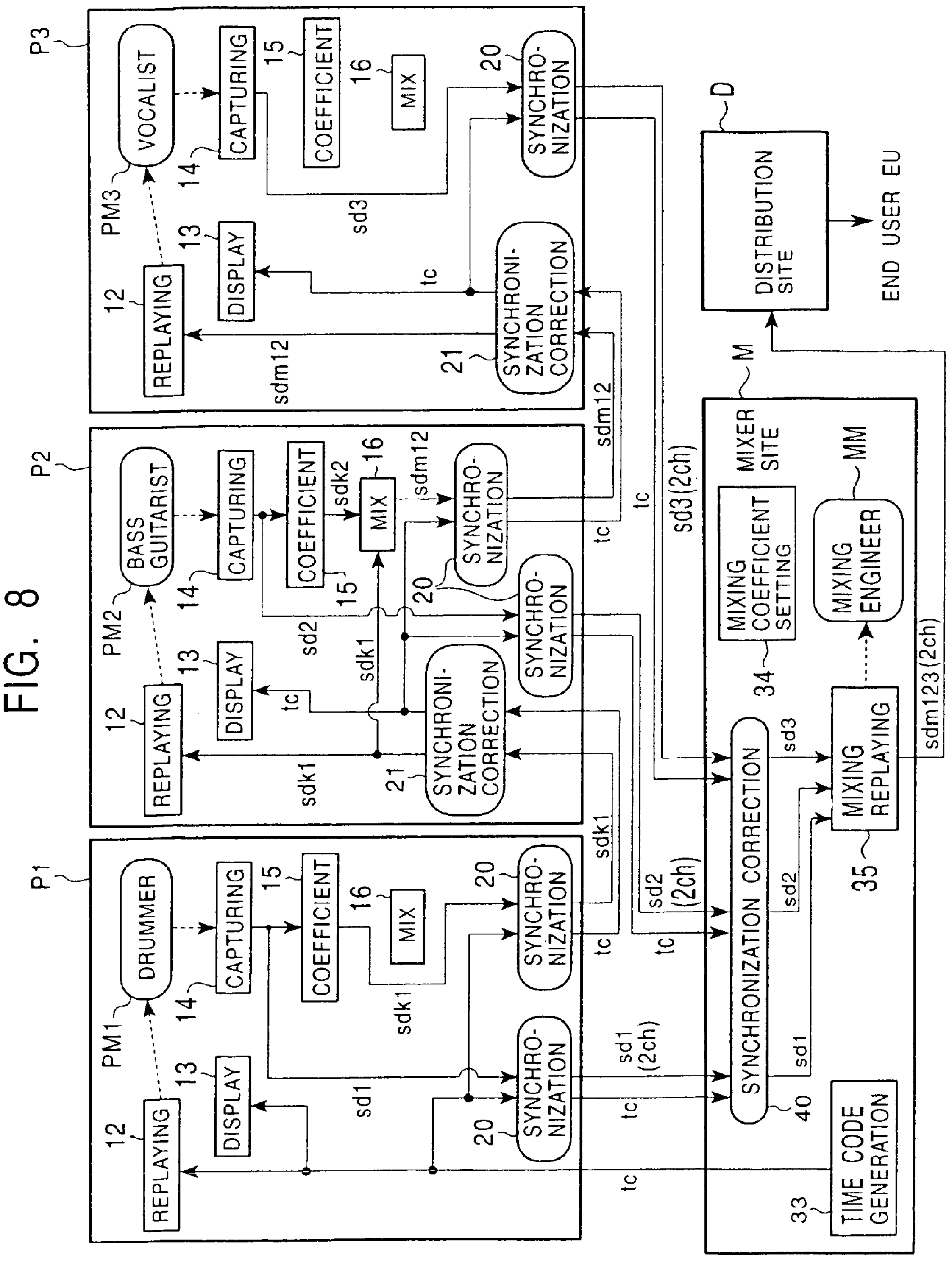
FIG. 8 is a diagram illustrating the system in another transfer state thereof during the live performance phase.

FIGS. 7 and 8 illustrate two communication states for live performance expected to be carried subsequent to the rehearsal and the mixing coefficient setting phase.

Communication Operation Example 1 During Live Performance

The communication operation example illustrated in FIG. 7 is discussed hereinafter.

Referring to FIG. 7, upon starting live performance, the mixer site M generates the time code tc at the time code generator 33, and transmits it to the first performer site P1.

In response to the time code tc, the first performer site P1 replays and outputs a live performance guide sound such as a clicking sound in the replay unit 12, and displays the point of progress of the music on a musical score image on the display 13.

The performer PM1 at the first performer site P1 drums in concert with the clicking sound and the musical score image.

The first performer site P1 captures a drum sound by the performer PM1 as the two-channel audio data through the capturing unit 14, and outputs the audio data as the live performance signal sd1.

The live performance signal sd1 is subjected to a multiplication of a mixing coefficient in the mixing/panning coefficient unit 15, and is then output as a live performance signal sdk1. The mixing coefficient is a value that has been set during the mixing coefficient setting phase and results in the optimum mixing state for drum playing.

The live performance signal sdk1 is synchronized with the received time code tc in the synchronization process 20, and is then sent to the middle performer site P2.

The middle performer site P2 performs a synchronization correction process 21 on the live performance signal sdk1 and the time code tc transmitted from the first performer site P1. Specifically, the middle performer site P2 extracts the live performance signal sdk synchronized with the time code tc in the form of real-time stream data. The live performance signal sdk1 is fed to the replay unit 12, which in turn replays the live performance signal sdk1 (namely, a drum sound).

The display 13 shows the point of progress of the music over the musical score in accordance with the received time code tc.

The performer PM2 at the middle performer site P2 plays the bass guitar in concert with the drum sound and the musical score.

The bass guitar sound by the performer PM2 is captured by the capturing unit 14 as the two-channel audio data at the middle performer site P2, and is output as the live performance signal sd2.

The captured live performance signal sd2 is processed with an optimum mixing coefficient for the bass guitar sound set in the above-referenced mixing coefficient setting phase in the mixing/panning coefficient unit 15, thereby becoming a live performance signal sdk2. The live performance signal sdk2 is mixed with the received live performance signal sdk1 in the stereo mixing unit 16, and is output as a live performance signal sdm12 (i.e., the drum sound+the bass guitar sound). The live performance signal sdm12 is synchronized with the received time code tc in the synchronization process 20, and the live performance signal sdm12 and the time code tc are transmitted to the end performer site P3.

In the end performer site P3, the live performance signal sdm12 and the time code tc transmitted from the middle performer site P2 are subjected to the synchronization correction process 21. Specifically, the middle performer site P3 extracts the live performance signal sdm12 synchronized with the time code tc in the form of real-time stream data. The live performance signal sdm12 is fed to the replay unit 12, which in turn replays the live performance signal sdm12 (namely, the mix of the drum sound and the bass guitar sound).

The display 13 shows the point of progress of the music over the musical score in accordance with the received time code tc.

The performer PM3 at the end performer site P3 sings a song in concert with the drum sound, the bass guitar sound, and the musical score.

The end performer site P3 captures the vocal sound of the performer PM3 as two-channel audio data through the capturing unit 14, and outputs the two-channel audio data as a live performance signal sd3.

The live performance signal sd3 is processed with an optimum mixing coefficient for the vocal sound set in the above-referenced mixing coefficient setting phase in the mixing/panning coefficient unit 15, thereby becoming a live performance signal sdk3. The live performance signal sdk3 is mixed with the received live performance signal sdm12 in the stereo mixing unit 16, and is output as a live performance signal sdm123 (i.e., the drum sound+the bass guitar sound+the vocalist sound).

The live performance signal sdm123 is two-channel audio data that is obtained by mixing the sounds played at the performer sites P1-P3 at the proper levels and the proper panning stereo positions. Specifically, the live performance signal sdm123 is complete audio data that is a mix of the sounds from the three performers PM1, PM2, and PM3 in the form of music played by a band.

The live performance signal sdm123 obtained from the end performer site P3 is transmitted to the distribution site D as complete sound data, and is then handled as a delivery content to the end users EU.

Like the performer sites P1 and P2, the end performer site P3 may include the synchronization process 20, to which the live performance signal sdm123 obtained in the stereo mixing unit 16 and the received time code tc are subjected, and the resulting live performance signal sdm123 may be sent to the distribution site D. When the time code tc is not necessary as a delivery content to the end user EU, the time code tc may be removed in the distribution site D.

In the above-mentioned communication operation, the final concert sound (the live performance signal sdm123) is obtained with no effect of the signal delay through the network communication. When transmission is made through the performer sites P1-P3 in a chain fashion, a signal delay takes place. Although the performance by the performers PM1, PM2, and PM3 suffer from time misalignment, each live performance signal mixed in the stereo mixing unit 16 in each of the performer sites P2 and P3 is free from time misalignment. Specifically, the performer PM2 drums in concert with the live performance signal sdk1 (the drum sound) at the received timing thereof, and the stereo mixing unit 16 mixes the live performance signal sdk1 as the drum sound with the live performance signal sdk2 as the bass guitar sound. The resulting mixed sound is free from the time delay through the network transfer. The same is true of the end performer site P3. The live performance signal sdm12 is mixed with the live performance signal sdk3 with no time misalignment involved. The complete live performance signal sdm123 from the end performer site P3 becomes mixed data free from the effect of the signal delay in communication.

The coefficient values for the performer sites P1-P3 at the mixing/panning coefficient unit 15 are set to an optimum state through the rehearsal phase and the mixing coefficient setting phase. The complete live performance signal sdm123 is the data in a state set as optimum by the mixing engineer MM during the rehearsal phase. Volume balance and panning position of each instrument are thus free from an unpredictably inappropriate state.

Since the data communicated between the performer sites P1-P3 is packet data including the two-channel audio data stream and the time code tc at any given time, the data amount thereof is not increased. Since the live performance signal is mixed and then sent to the subsequent performer site P, the system is free from the problem that the number of channels increases with the data amount increasing as the live performance signal approaches the end performer site P3. Since no large transfer capacity is required of the network communication, communication traffic is small, and such a network is easy to establish.

The performers PM at the second performer site P thereafter play while listening to the music played by the performer PM at the performer site having a prior order. The ease with which each performer PM plays is thus improved. Since each performer PM plays while listening to the tempo and rhythm generated by another performer PM, each performer PM can enjoy playing as if he or she were actually playing at the same location. The complete live performance signal sdm123 thus provides the concert sound conveying the tempo and rhythm and a sense of team playing (togetherness), thereby delivering a live performance sound to the end user EU.

Since the live performance is performed even if the performers PM are far apart from each other, a variety of performance contents may be provided. For example, musicians at home and abroad may concurrently perform in concert.

Communication Operation Example 2 During Live Performance

The communication operation example illustrated in FIG. 8 is discussed hereinafter.

Referring to FIG. 8, upon starting live performance, the mixer site M generates the time code tc at the time code generator 33, and transmits it to the first performer site P1.

In response to the time code tc, the first performer site P1 replays and outputs a live performance guide sound such as a clicking sound in the replay unit 12, and displays the point of progress of the music on a musical score image on the display 13.

The performer PM1 at the first performer site P1 drums in concert with the clicking sound and the musical score image.

The first performer site P1 captures a drum sound by the performer PM1 as the two-channel audio data through the capturing unit 14, and outputs the audio data as the live performance signal sd1.

The live performance signal sd1 is subjected to a multiplication of a mixing coefficient in the mixing/panning coefficient unit 15, and is then output as a live performance signal sdk1.

The live performance signal sdk1 is synchronized with the received time code tc in the synchronization process 20, and is then sent to the middle performer site P2.

The live performance signal sd1 captured by the capturing unit 14 is synchronized with the received time code tc in the synchronization process 20 and is then sent to the mixer site M.

The middle performer site P2 subjects the live performance signal sdk1 and the time code tc transmitted from the first performer site P1 to the synchronization correction process 21. Specifically, the middle performer site P2 extracts the live performance signal sdk1 synchronized with the time code tc in the form of real-time stream data. The live performance signal sdk1 is fed to the replay unit 12, which in turn replays the live performance signal sdk1 (namely, a drum sound).

The display 13 shows the point of progress of the music over the musical score in accordance with the received time code tc.

The performer PM2 at the middle performer site P2 plays the bass guitar in concert with the drum sound and the musical score.

The bass guitar sound by the performer PM2 is captured by the capturing unit 14 as the two-channel audio data at the middle performer site P2, and is output as the live performance signal sd2.

The captured live performance signal sd2 is processed with an optimum mixing coefficient set in the above-referenced mixing coefficient setting phase in the mixing/panning coefficient unit 15, thereby becoming a live performance signal sdk2. The live performance signal sdk2 is mixed with the received live performance signal sdk1 in the stereo mixing unit 16, and is output as a live performance signal sdm12 (i.e., the drum sound+the bass guitar sound). The live performance signal sdm12 is synchronized with the received time code tc in the synchronization process 20, and the resulting live performance signal sdm12 is transmitted to the end performer site P3.

The live performance signal sd2 captured by the capturing unit 14 is synchronized with the time code tc in the synchronization process 20, and the resulting live performance signal sd2 is transmitted to the mixer site M.

In the end performer site P3, the live performance signal sdm12 and the time code tc transmitted from the middle performer site P2 are subjected to the synchronization correction process 21. Specifically, the middle performer site P3 extracts the live performance signal sdm12 synchronized with the time code tc in the form of real-time stream data. The live performance signal sdm12 is fed to the replay unit 12, which in turn replays the live performance signal sdm12 (namely, the mix of the drum sound and the bass guitar sound).

The display 13 shows the point progress of the music over the musical score in accordance with the received time code tc.

The performer PM3 at the end performer site P3 sings a song in concert with the drum sound, the bass guitar sound, and the musical score.

The end performer site P3 captures the vocal sound of the performer PM3 as two-channel audio data through the capturing unit 14, and outputs the two-channel audio data as a live performance signal sd3.

The live performance signal sd3 captured by the capturing unit 14 is synchronized with the received time code tc in the synchronization process 20, and is then transmitted to the mixer site M.

In response to the operations of the performer sites P1-P3, the mixer site M receives the live performance signal sd1 and the time code tc from the first performer site P1, the live performance signal sd2 and the time code tc from the middle performer site P2, and the live performance signal sd3 and the time code tc from the end performer site P3.

Like in the rehearsal phase, the live performance signals sd1, sd2, and sd3 suffer from a slight timing misalignment due to a time delay occurring in signal transfer along the network.

The mixer site M performs a synchronization correction process 40 on the live performance signals sd1, sd2, and sd3 with respect to the time codes tc coming in theretogether in the same manner as in the rehearsal phase.

The mixing replay unit 35 mixes the live performance signals sd1, sd2, and sd3 with no timing misalignment. The mixing coefficients for the live performance signals sd1, sd2, and sd3 are the optimum mixing coefficients set by the mixing engineer MM during the rehearsal phase.

The data mixed by the mixing replay unit 35 is a complete live performance signal sdm123 (i.e., the drum sound+the bass guitar sound+the vocalist sound), and is transmitted to the distribution site D, and handled as a delivery content.

In this case, mixing for obtaining the complete live performance signal sdm123 is carried out in the mixer site M unlike in the arrangement shown in FIG. 7.

The coefficient multiplication carried out in the mixing/panning coefficient unit 15 in each of the performer sites P1 and P2, and the mixing carried out in the stereo mixing unit 16 in the middle performer site P2 are intended to optimize the mixing state of a vocal replayed by the mixing replay unit 35 in a subsequent performer site P.

The embodiment shown in FIG. 8 has the same advantages as those of the embodiment shown in FIG. 7.

Since the complete live performance signal sdm123 is mixed in the mixer site M in the embodiment show in FIG. 8, some degree of flexibility is allowed in mixing. For example, the mixing engineer MM can modify the mixing state during live performance.

Referring to FIG. 8, the coefficient multiplication by the mixing/panning, coefficient unit 15 in each performer site P is not intended for use in mixing for obtaining the complete live performance signal sdm123, but intended for optimizing replayed monitor sound in a subsequent performer PM. Therefore, accurate setting of the coefficient from the mixer site M is not a requirement. For example, the coefficient setting during the mixing coefficient setting phase may be skipped and left to each performer site P.

5. Modifications

A variety of modifications of present invention is contemplated as discussed below.

Figure 9:
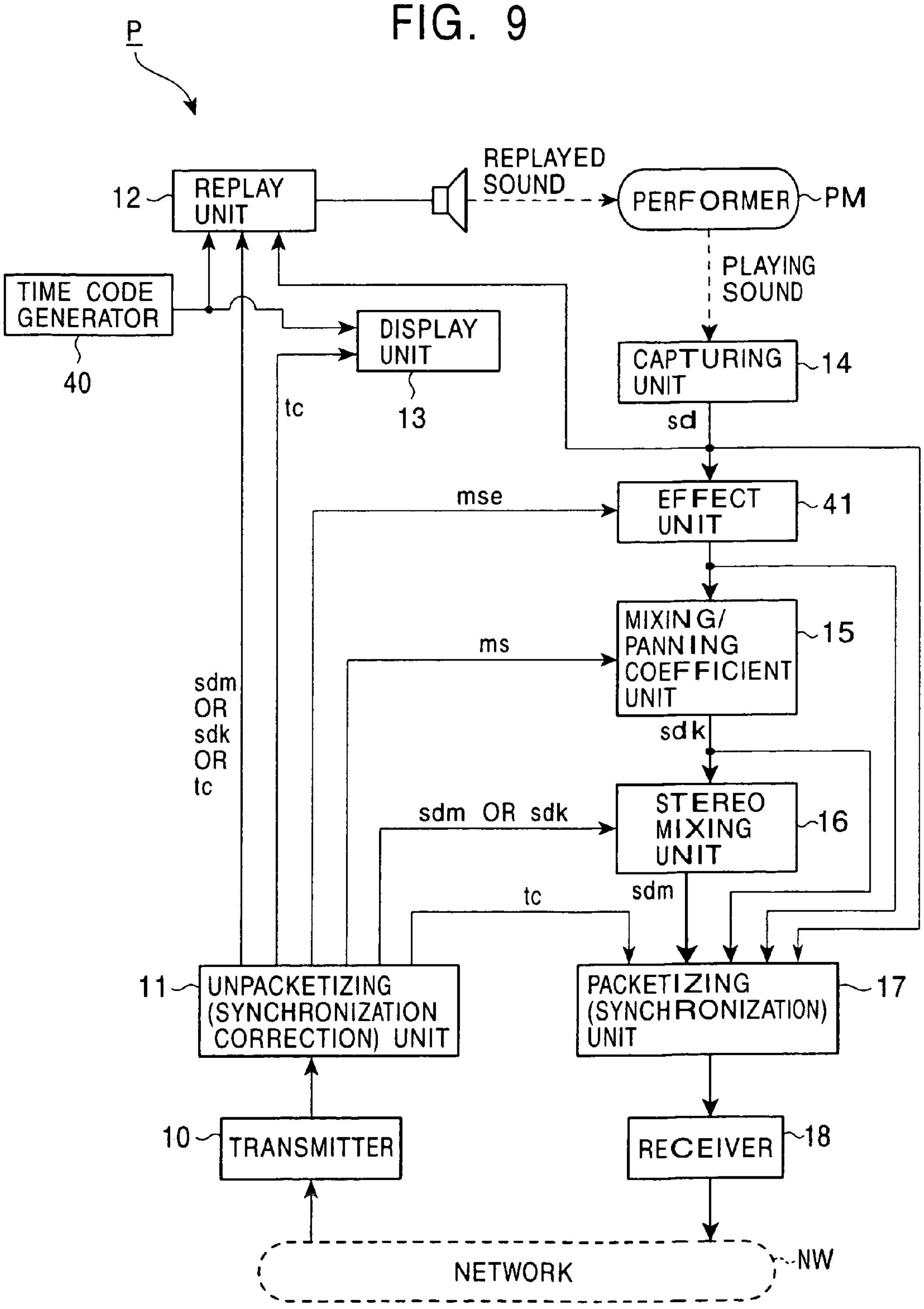
FIG. 9 is a block diagram showing another performer site of the present invention.

The performer site P shown in FIG. 9 is contemplated.

The performer site P includes a time code generator 40.

During the rehearsal phase and the live performance, only the first performer site P1 generates the time code tc in the time code generator 40, and supplies the replay unit 12 and the display 13 with the time code tc. The replay unit 12 generates a clicking sound in response to the time code tc, and the point of progress of the music is displayed on the musical score on the display 13.

The rest of the operation remains unchanged from that already discussed hereinabove.

When the first performer site P1 has the time code generator 40, it is not necessary for the mixer site M to transmit the time code tc to the first performer site P1 during the rehearsal phase and the live performance. Furthermore, the time code generator 33 is dispensed with in the mixer site M.

Referring to FIG. 9, the performer site P includes an effect unit 44. The effect unit 41 performs a sound effect process, such as reverb, compressor, echo, equalizing, etc. on the live performance signal sd output from the capturing unit 14.

The use of the effect unit 41 allows any sound effect to act on the live performance signal sd at each performer site P.

As shown, an effect coefficient control signal mse for setting a coefficient for an effect in the effect unit 41 is supplied from the mixer site M so that an effect state is set in each performer site P. The effect coefficient may be set during the above-referenced mixing coefficient setting phase.

The mixer site M thus controls the effect state for the live performance signal sd, thereby resulting in a live performance signal (or a complete live performance signal) sdm into which each live performance signal sd is mixed in an appropriate effect state.

It is also contemplated that the live performance signal sdm subsequent to the mixing is subjected to the effect process or that the mixing replay unit 35 in the mixer site M performs the effect process on each live performance signal sd.

Referring to FIG. 9, the live performance signal sd captured by the capturing unit 14 is fed to the replay unit 12. The performer PM preferably monitors the volume balance of the musical sound played by himself or herself.

The live performance signal sd is supplied to the replay unit 12. The replay unit 12 mixes the live performance signal sd with other live performance signals sdk, sdm, etc. for replaying an output signal so that the ease with which each performer plays is improved.

In the above embodiments, the live performance signals sd, sdk, and sdm, transmitted to each of the performer sites P and the mixer site M, are linear PCM data. These signals may be compression encoded before being transmitted. For example, a compression encoder may be arranged at a stage prior to the packetizing unit 17. In this case, however, a decompression process is carried out during reception. A decompression decoder may be arranged at a stage subsequent to the unpacketizing unit 11 or 37 in each performer site P and the mixer site M. The compression method may be any coding such as ATRAC (Adaptive TRansform Acoustic Coding), ATRAC3 coding, MPEG (Motion Picture Expert Group) audio coding.

The data rate through the network NW is improved by compressing data during a communication.

In this embodiment, the live performance system includes the mixer site M and the plurality of performer sites P. Alternatively, one performer site (such as the first performer site P1) may have the function of the mixer site M, or the function of the mixer site M may be entirely dispensed with.

If at least the first performer site P1 includes the time code generator 40 as shown in FIG. 9, and if mixing coefficient setting is performed in each performer site P, the mixer site M is not needed.

It is contemplated that a communication system (a transfer channel) is separately arranged between the mixer site M and each of the performer sites P for voice communication of operators. Using the voice communication, proper mixing coefficients may be communicated. The operators at the performer sites thus carry out the operation during the mixing coefficient setting phase.

The setting of the mixing coefficient (or the effect coefficient) at each performer site P may be varied with the point of progress of the music being played, rather than remaining fixed throughout the entire music. For example, the mixing/panning coefficient unit 15 may be set so that the mixing coefficient continuously varies with the point of progress of the music in response to the time code tc.

In the above-referenced embodiment, the generation of the performance guide sound, the displaying and control of the musical score, the synchronization, and the synchronization correction are carried out in accordance with the time code tc. The time code tc serving as the synchronization information may be in any form.

An actual sound such as a clicking sound in synchronization with the time code tc, instead of the time code tc itself, may be fed to the replay unit 12 in the performer site P. The display 13 simply shows the musical score with no time code tc fed thereto.

The live performance signals sd, sdk, and sdm are transmitted in synchronization with the time code tc. The present invention is not limited to any particular physical conditions and any particular communication protocol. Any communication method is acceptable as long as it establishes communication with the synchronization maintained between the time code tc and the live performance signals sd, sdk, and sdm.

The live performance signal sd, etc., communicated is the two-channel data in the above description. Alternatively, the live performance signal sd may be single-channel (monophonic) data or three-channel data.

During the rehearsal phase shown in FIGS. 4 and 5, and the live performance shown in FIG. 8, each performer site P transmits the live performance signal sd from the capturing unit 14 thereof to the mixer site M. Alternatively, the live performance signal sd to which the mixing coefficient is imparted may be transmitted to the mixer site M.

In the live performance system, some or all of the performers PM are not limited to humans, but may be an automatic music playing system such as an MIDI sound system.

The live performance system of the present invention finds applications in the supply of live performance directly to the end user EU, but also recording applications. Even if the players are at remote places, they can play music for recording with a sense of live performance (simultaneous playing). For example, recording the complete live performance signal shown in FIG. 7 presents a novel recording method.

If a multi-track recorder is used instead of the mixing replay unit 35 in the mixer site M in the communication method shown in FIG. 8, the players perform live recording with sounds (live performance signals) recorded on respective tracks. Recording is thus performed in the same manner as if the players gathered in the same recording studio to record music playing.

The embodiment of the present invention has been discussed based on the musical content generated by a band or an orchestra. The present invention is applicable to not only music but also to other fields.

For example, the present invention is applicable to a system for producing a movie, a theatrical performance, or a drama on a real-time basis.

For example, a background picture may be taken in the first performer site P1, effect sounds may be captured in the middle performer site P2, and one or a plurality of performers may act in the end performer site P3. Even if staffs are located at remote places, a performance may be acted.

When video data is mixed, the video data is synchronized with the time code tc and is then transmitted.

What is claimed is:

1. A live performance management device for controlling a plurality of live performance providing apparatus each operable to output a live performance signal, said device comprising:

means for generating synchronization information and for supplying the synchronization information to only one of the live performance providing apparatus by way of a communication network;

means for receiving a respective live performance signal and the synchronization information from each of the live performance providing apparatus by way of the communication network, wherein the synchronization information received at the receiving means from each of the live performance providing apparatus other than the one live performance providing apparatus is based on the synchronization information transmitted from the one live performance providing apparatus to a second live performance providing apparatus of the live performance providing apparatus other than the one live performance providing apparatus;

synchronization correction means for performing a synchronization correction process on the live performance signal based on the synchronization information received from each of the live performance providing apparatus; and synthesizer means for synthesizing the live performance signals synchronization corrected through the synchronization correction means.

2. The live performance management device according to claim 1, further comprising replay means for replaying the live performance signal synthesized by the synthesizer means.

3. The live performance management device according to claim 1, further comprising synthesis information setting means for transmitting synthesis information that sets a synthesis process of the synthesizer means to each said live performance providing apparatus.

4. A live performance management device for controlling a plurality of live performance providing apparatus each operable to output a live performance signal, said device comprising:

a time code generator to generate synchronization information and to supply the synchronization information to only one of the live performance providing apparatus;

a receiver to receive a respective live performance signal and the synchronization information from each of the live performance providing apparatus by way of a communication network, wherein the synchronization information received at the receiver from each of the live performance providing apparatus other than the one live performance providing apparatus is based on the synchronization information transmitted from the one live performance providing apparatus to a second live performance providing apparatus of the live performance providing apparatus other than the one live performance providing apparatus;

a synchronization correction unit to perform a synchronization correction process on the live performance signal based on the synchronization information received from each of the live performance providing apparatus; and a unit to synthesize live performance signals synchronization corrected by the synchronization correction unit.

* * * * *